United States Patent [19]
Licht

[11] Patent Number: 5,146,361
[45] Date of Patent: Sep. 8, 1992

[54] APPARATUS COMPRISING A MAGNETO-OPTIC ISOLATOR UTILIZING A GARNET LAYER

[75] Inventor: Steven J. Licht, Bridgewater, N.J.

[73] Assignee: AT&T Bell Laboratories, Murray Hill, N.J.

[21] Appl. No.: 850,148

[22] Filed: Mar. 12, 1992

Related U.S. Application Data

[63] Continuation of Ser. No. 380,580, Jul. 14, 1989, abandoned.

[51] Int. Cl.$^5$ .............................................. G02F 1/09
[52] U.S. Cl. ................................... 359/280; 359/281; 359/282; 359/484; 252/62.57; 427/128; 428/692
[58] Field of Search ...................... 350/375, 376, 377; 252/62.57, 583, 585; 428/692, 693, 611; 427/128, 47; 359/484, 280, 281, 282, 283, 488

[56] References Cited

U.S. PATENT DOCUMENTS

| | | | |
|---|---|---|---|
| 3,573,099 | 3/1971 | Moore et al. | 350/376 |
| 3,666,351 | 5/1972 | Pao | 350/376 |
| 3,764,195 | 10/1973 | Blank et al. | 350/376 |
| 4,295,988 | 10/1981 | Nelson et al. | 350/376 |
| 4,522,473 | 6/1985 | Hibiya et al. | 350/377 |
| 4,556,291 | 12/1985 | Chen | 350/377 |
| 4,728,178 | 3/1988 | Gualtieri et al. | 428/692 |
| 4,756,607 | 7/1988 | Watanabe et al. | 350/375 |
| 4,932,760 | 6/1990 | Arii et al. | 350/375 |
| 4,973,119 | 11/1990 | Taki | 350/377 |
| 4,981,341 | 1/1991 | Brandle, Jr. et al. | 359/281 |

FOREIGN PATENT DOCUMENTS

| | | | |
|---|---|---|---|
| 0166924 | 1/1986 | European Pat. Off. | 350/375 |
| 60-134404 | 7/1985 | Japan | 350/377 |
| 61-292613 | 12/1986 | Japan | 350/375 |

OTHER PUBLICATIONS

Klages et al.; "LPE Growth of Bismuth Substituted Gadolinium Garnet Layers: Systematization of Experimental Results"; Journal of Crystal Growth, 64 (1983) pp. 275-284.

Whitcomb et al.; "Fabrication of Thin Film Magnetic Garnet Structures for Intracavity Laser Applications" Rockwell International; pp. 1-2.

Robertson et al.; "Preparation and Optical Properties of Single Crystal Thin Films of Bismuth Substituted Iron Garnets for Magneto-Optic Applications"; Philips Research Laboratories; Aug. 1973 pp 1–40.

"A New Improved (YbTbBi)$_3$Fe$_5$O$_{12}$ Epitaxial Thick Film", by K. Nakajima, *IEEE Transactions on Magnetics*, vol. 24, No. 6, Nov. 1968.

"Growth of Bi-Substituted Garnet Thick Epitaxial Films for Optical Isolators", by K. Machida et al., *Advances in Magneto-Optics, Proc. Int. Symp. Magneto-Optics, J. Magn. Soc. Jpn*, vol. 11, Supplement, No. S1 (1987) 347-351.

"Study of the Liquid Phase Epitaxy Process of Garnet Layers by Induced Striations", by P. Gornet et al., *Physica Status Solidi A*, vol. 41, pp. 505-511.

*Primary Examiner*—Bruce Y. Arnold
*Assistant Examiner*—R. D. Shafer
*Attorney, Agent, or Firm*—E. E. Pacher

[57] ABSTRACT

Apparatus according to the invention comprises a magneto-optic isolator. The isolator comprises a magneto-optic member that comprises a single crystal substrate and a single crystal garnet layer on the substrate. The garnet layer comprises a first and a second stratum. The composition of the former is chosen such that the lattice constant of the first stratum material is substantially equal to that of the substrate at a first temperature (e.g., room temperature), and is substantially larger than that of the substrate at a second temperature (e.g., the garnet growth temperature) that is higher than the first temperature. The composition of the second stratum is chosen such that the lattice constant of the second stratum is less than that of the substrate at the first temperature, and is less than that of the first stratum at the second temperature. Wafers according to the invention typically are less subject to fracture than analogous prior art wafers.

8 Claims, 2 Drawing Sheets

APPARATUS COMPRISING A MAGNETO-OPTIC ISOLATOR UTILIZING A GARNET LAYER

This application is a continuation of application Ser. No. 07/380,580, filed on Jul. 14, 1989, now abandoned.

FIELD OF THE INVENTION

This invention pertains to apparatus that comprises a magneto-optic isolator, and in particular, to apparatus that comprises an isolator that utilizes a garnet film as the Faraday rotator.

BACKGROUND OF THE INVENTION

In many applications of lasers or other radiation sources it is important to prevent reflected radiation from interacting with the source, since such interaction can, for instance, generate noise and unwanted feedback. An example of an application in which there frequently is a need to isolate a source from reflected radiation is lightwave communications, especially high bit rate communications over relatively long distances.

It has long been known that the Faraday effect in magneto-optic materials can be used to provide a non-reciprocal device that can serve as an isolator, i.e., a device which permits light passage in only one direction. Yttrium iron garnet (YIG) is a magneto-optic material that has been used for isolator applications. However, YIG has recently become quite expensive. Furthermore, it has only a relatively small specific rotation in the near infrared wavelength regime of interest for lightwave communications (e.g., 0.8–1.6 $\mu$m), such that a large path length (about 2.7 mm for 1.31 $\mu$m radiation) is required to provide the 45° rotation of the plane of polarization that is necessary for an isolator. It also has a high saturation magnetization, which typically requires the use of a large, high field (e.g., SmCo) magnet that typically is not only expensive but also may affect, and be affected by, nearby components.

It is known that Bi substitution in rare earth iron garnets can greatly increase the specific Faraday rotation of these materials. Relatively thin films (of order 10 $\mu$m) of Bi-substituted garnets were grown on appropriate substrates by liquid phase epitaxy (LPE) for magnetic bubble devices. However, for magneto-optic isolators relatively thick (e.g., of order 300 $\mu$m) films have to be grown, and this poses difficult problems, due typically to significant differences in thermal expansion between the substrate material and the garnet film grown thereon. These differences are thought to be the cause of the frequently observed cracking of such films. Such cracking obviously decreases yield and thus results in increased cost.

Cracking is known to occur less frequently if the garnet film is grown on only one side of the substrate, since stress can be relieved through bowing of the substrate/film combination. However, such one-sided LPE growth typically poses difficult control problems, due to increased growth time and surface agitation of the melt. Such one-sided films thus are relatively difficult to manufacture. K. Nakajima et al., *IEEE Transactions on Magnetics*, Vol. 24(6), pp. 2565–2567, and K. Machida et al., *Proceedings of the International Symposium on Magento-Optics, Journal of the Magnetics Soc. of Japan*, Vol. 11, Supplement, No. Sl, pp. 347–351, both report one-sided growth of $(YbTbBi)_3Fe_5O_{12}$ films on a garnet substrate.

In view of the technological importance of garnet films on a substrate for use in magneto-optic isolators, it would be highly desirable to have available such films that have relatively high specific rotation, relatively small temperature dependence, and relatively low saturation magnetization that are relatively easy to manufacture, and that, significantly, are less subject to fracture than comparable prior art films. This application discloses such films, and an advantageous method of producing them.

SUMMARY OF THE INVENTION

Disclosed are garnet films that overcome many of the problems associated with prior art garnet films for magneto-optic isolators. In particular, garnet films that typically are less subject to fracture or cracking than prior art films are disclosed. This improved mechanical stability results from judicious compositional variation in the garnet films which leads to at least partial compensation of internal stress in the substrate/film combination.

In one aspect the invention comprises apparatus that comprises a source of electromagnetic radiation (typically a semiconductor radiation source such as a laser diode or a LED), radiation utilization means (exemplarily an optical fiber), and magento-optic isolator means between the source and the utilization means. The isolator means comprise polarizing means, magnet means and a magneto-optic member that comprises a single crystal magneto-optic garnet layer epitaxial with a single crystal substrate (typically a garnet substrate). As is well known, associated with a given cubic crystalline material is a lattice constant, typically designated "a", that is, inter alia, a function of temperature.

The inventive magneto-optic garnet layer comprises at least one first and one second "stratum" of garnet material. The strata typically are parallel to each other and to the substrate surface. The first stratum has a (first) composition selected such that the lattice constant of the first stratum is substantially equal to the lattice constant of the substrate at a first temperature (exemplarily room temperature), and such that the lattice constant of the first stratum is larger than the lattice constant of the substrate at a second temperature that is higher than the first temperature (exemplarily the growth temperature of the garnet layer). The second stratum has a (second) composition selected such that the lattice constant of the second stratum is less than the lattice constant of the substrate at the first temperature and less than the lattice constant of the first material at the second temperature. Typically, but not necessarily, the lattice constant of the second stratum at the second temperature is between that of the first stratum and that of the substrate.

In exemplary currently preferred embodiments the substrate is a single crystal (Mg,Ca,Zr)-substituted gadolinium gallium garnet (MCZ:GGG) wafer, the first stratum has composition $(Bi_xB_{3-x})Fe_{5-z}C_zO_{12}$, where B is one or more rare earths (atomic number 57–71) the optional C is Ga, Al, or combinations thereof, $1 \leq X \leq 2.5$, and $0 \leq z \leq 1$. In these preferred embodiments the second stratum has composition $(Bi_{x'}B_{3-x'})Fe_{5-z}C_zO_{12}$, where $x' < x$. The C concentration typically is nominally the same in the first and second strata.

BRIEF DESCRIPTION OF THE DRAWINGS

Analogous features in different figures are designated by the same numeral. The figures are not intended to show true proportions and/or dimensions.

DETAILED DESCRIPTION OF SOME PREFERRED EMBODIMENTS

Figure 1:
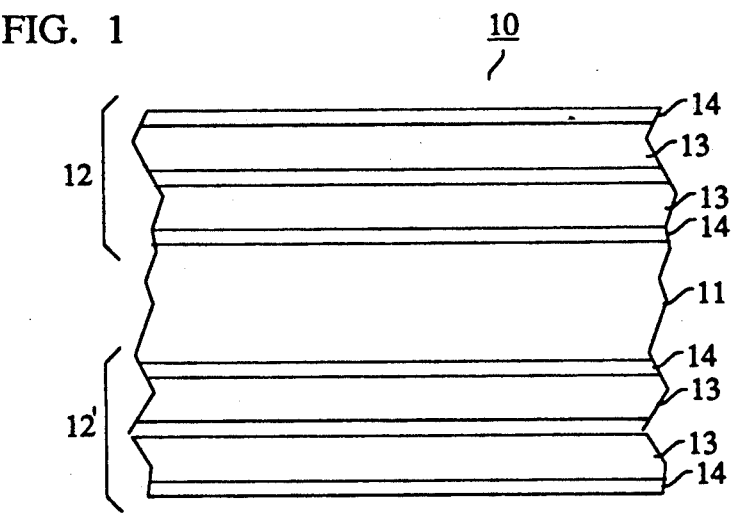
FIG. 1 schematically depicts a portion of a magneto-optic member according to the invention.

FIG. 1 schematically depicts a portion of an exemplary two-sided magneto-optic member 10 according to the invention, wherein numeral 11 refers to the substrate, and numerals 12 and 12' refer to the garnet layers that are epitaxial with the substrate. It will be understood that magneto-optic members according to the invention need not be two-sided as shown in FIG. 1, although this is the case in currently preferred embodiments. Each garnet layer (e.g., 12) comprises one or more "first" strata 13, and one or more "second" strata 14 (not all of which are labeled in FIG. 1). Exemplarily, the first strata have a composition such that their lattice constant is approximately equal to that of the substrate at room temperature, and the second strata have a composition such that their lattice constant is between that of the first stratum and of the substrate at the growth temperature of the garnet layers, exemplarily in the range 750°–825° C.

Figure 2:
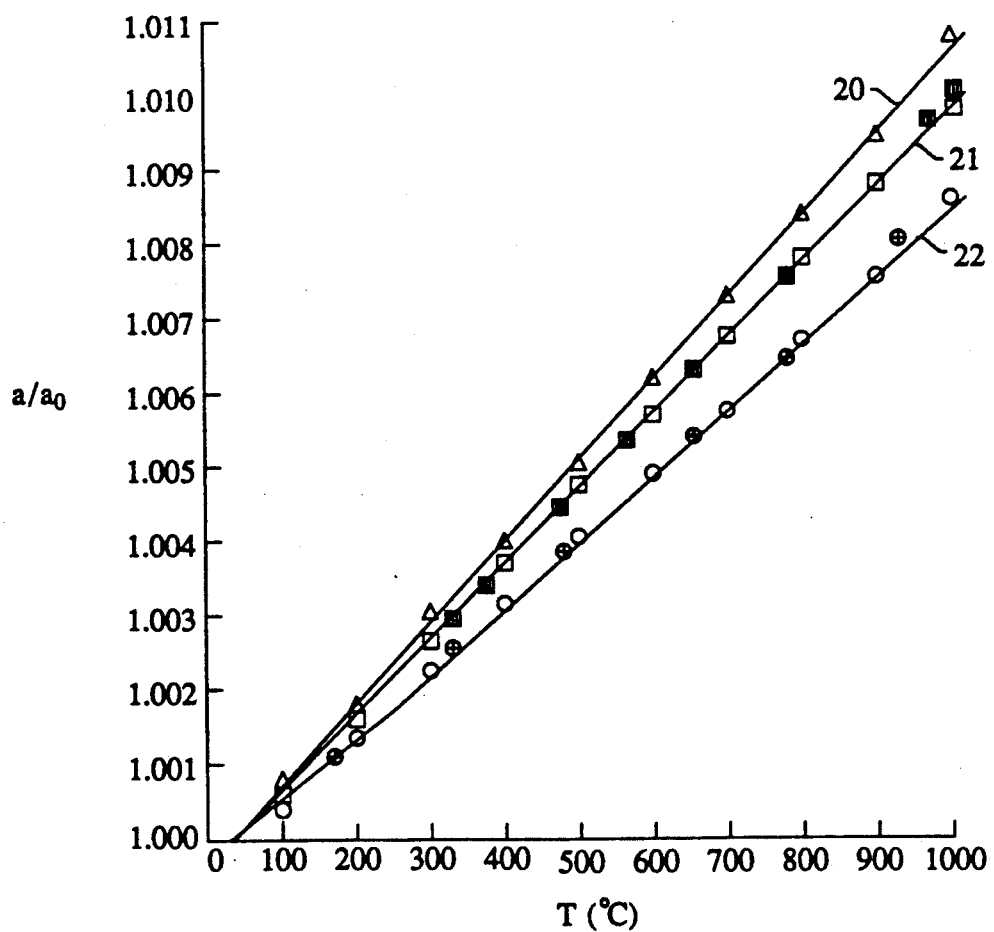
FIG. 2 shows curves of lattice constants of several garnet materials as a function of temperature.

In FIG. 2 are shown curves of normalized lattice constants versus temperature, with "$a_o$" being the lattice constant of the given material at room temperature (22° C.). Curve 20 pertains to the garnet of composition $(Bi_{1.6}Tb_{1.0}Yb_{0.4}) (Fe_{4.7}Ga_{0.3})O_{12}$, 21 to $Tb_3Fe_5O_3$ (TbIG; light squares), $Gd_3Fe_5O_{12}$ (GdIG) and $Y_3Fe_5O_{12}$ (YIG; both dark squares), and 22 to $Gd_3Ga_5O_{12}$ (GGG; dark circles) and MCZ:GGG (light circles).

As can be seen from FIG. 2, thermal expansion of MCZ:GGG is substantially less than that of the Bi-containing garnet of curve 20 or of TbIG. Furthermore, the Ga-garnets of curve 22 show a change of thermal expansion coefficient at about 250° C., with the thermal expansion below that temperature rapidly deviating from the Fe-garnet curves.

Exemplarily, if the substrate is MCZ:GGG and the garnet layer grown thereon has composition substantially as the material of curve 20 of FIG. 2 and is substantially lattice matched to the substrate at room temperature, then the substrate is subject to tensile stress at the growth temperature. On the other hand, if the Bi content of the garnet layer grown on the MCZ:GGG substrate were substantially lower than that of the material of curve 20 (with correspondingly increased Tb, and possibly other rare earth, content), then the lattice constant of the garnet layer could be substantially lower than that of the substrate at room temperature and be less than that of the above discussed garnet layer at the growth temperature. Under these circumstances the substrate would be under smaller tensile stress at the growth temperature, and would be under compressive stress at room temperature. By combining strata that exert, respectively, tensile and compressive stress on the substrate at the first temperature it is possible to reduce the total stress exerted on the substrate, and thereby reduce the liklihood of fracture.

In a particular class of currently preferred embodiments the first stratum has composition $(Bi_xT-b_yRE_{3-x-y}) Fe_{5-z}Ga_zO_{12}$, wherein optional constituent RE is one or more rare earth elements (other than Tb), $1 \leq X \leq 2.5$, frequently $\leq 2$, $0 \leq y \leq 3$, and with $0 \leq z \leq 1$. Bi is present to, inter alia, provide relatively large specific Faraday rotation, Tb serves to, inter alia, reduce the temperature dependence of the Faraday rotation, and RE may be used, inter alia, to tailor the lattice constant of the material. For values of x less than about 1 the specific Faraday rotation typically is small, requiring that the garnet layer be too thick to be useful for many applications. On the other hand, for x greater than about 2.5 the thermal expansion mismatch between garnet layer and substrate typically is too large to result in good magneto-optic elements. The value of 3-x-y typically is less than about 1.2. Ga serves, inter alia, to reduce the magnetic field required to achieve magnetic saturation of the garnet layer. However, Ga substitution for Fe typically increases the compensation point of the garnet material, and for z greater than about 1 the compensation temperature is too high for many purposes.

In the above referred-to currently preferred embodiments the composition of the second stratum is $(Bi_{x'}Tb_{y'}RE_{3-x'-y'})Fe_{5-z}Ga_zO_{12}$, with RE defined as above, and with z essentially the same value as in the first composition. The value of x' is less than that of x, the difference being chosen such that the desired difference in lattice parameter results. The concentrations of Tb and of the optional RE are adjusted such that the sum of Bi, Tb and RE equals 3 per formula unit, as is well known to those skilled in the art. In the currently preferred embodiments the substrate is (MCZ:GGG).

The presence of second strata in magneto-optic members according to the invention is readily ascertainable, e.g., by means of an etching procedure substantially as disclosed by P. Gornert et al., *Physica Status Solidi A*, Vol. 41, pages 505-511.

Figure 3:
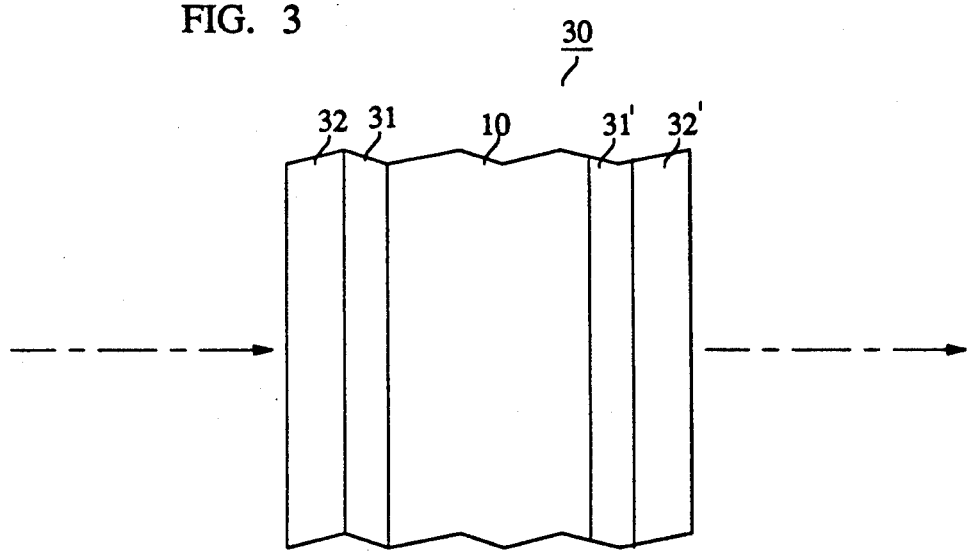
FIG. 3 schematically shows a magneto-optic member according to the invention.

FIG. 3 schematically depicts an exemplary assembly 30 comprising a magneto-optic member according to the invention (10) and further comprises polarization means (32 and 32') that are attached to the member 10 by index matching adhesive means (31 and 31'). Polarization means useful in the practice of the invention are known. Rutile wedges and polarizing glass are exemplary of such means. Index matching adhesive means are also well known and comprise commercially available infrared transparent epoxies. As those skilled in the art know, the polarizing means 32' are typically oriented at 45° with respect to 32, and the member 10 is designed to rotate the plane of polarization of radiation of the design wavelength (e.g., about 1.3 μm) by 45°. In this case essentially all of the radiation that has passed through the polarizer 32 will also pass through 32'. Furthermore, all the reflected radiation that has passed through 32' will be polarized at 90° to the orientation of 32 and will be blocked.

Figure 4:
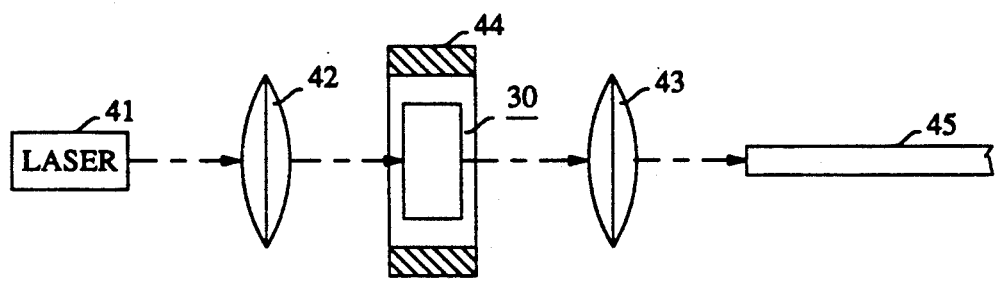
FIG. 4 depicts schematically exemplary apparatus according to the invention.

FIG. 4 shows schematically exemplary apparatus 40 according to the invention. The apparatus comprises a radiation source 41, typically a semiconductor laser or LED, whose output can be modulated by appropriate means (not shown) in accordance with an external signal. Optional focusing means 42 direct the emitted radiation onto assembly 30 of the type shown in FIG. 3. Radiation transmitted through 30 is directed by optional focusing means 43 onto optical fiber 45. Permanent magnet 44 provides a magnetic field of strength sufficient to cause magnetic saturation of the garnet layers in assembly 30. Focusing means useful in apparatus according to the invention are known and include spherical lenses and GRIN rods. As will be appreciated by those skilled in the art, the inventive isolator means can be incorporated into a laser or LED package or can be provided in the form of a separate in-line device.

In currently preferred apparatus according to the invention, the garnet layer composition is chosen such that the saturation magnetization is relatively low, advantageously less than 500 G, and such that the magnetic compensation temperature is substantially below room temperature, advantageously $< -20°$ C. Furthermore, the temperature dependence of the Faraday rotation desirably is $<0.06°/°C.$, while the specific rotation desirably is high, desirably substantially larger than the rotation of 16.6°/mm obtainable with YIG. The exemplary composition $(Bi_{1.6}Tb_{1.0}Yb_{0.4})(Fe_{4.7}Ga_{0.3})O_{12}$ meets the above requirements, as do many other compositions within the above specified ranges.

Garnet members according to the invention typically are produced by LPE. Exemplarily, a (111) MCZ:GGG substrate is first etched for 1–2 minutes in hot (160° C.) phosphoric acid, followed by cleaning in a hot surfactant solution (70° C., no ultrasonics), rinsed thoroughly in deionized water, spray rinsed, and blown dry with filtered $N_2$.

The thus prepared substrate is then placed into an appropriate holder and immersed in a melt for LPE growth. The melt advantageously comprises PbO and $B_2O_3$ flux and further comprises oxides of the desired constituents of the garnet. Since the presence of Pb in the garnet can cause radiation absorption in the isolator, the amount of Pb in the flux is desirably kept low, even though PbO is an otherwise desirable flux. Exemplarily, a melt with a 1:1 ratio of bismuth and lead oxides has been found to yield acceptable results. $B_2O_3$ promotes melt stability, permitting relatively large undercooling. Flux comprising at least about 25% $B_2O_3$ typically is desirable. The total concentration of the solute is typically adjusted to yield the desired saturation and growth temperatures, as is known to those skilled in the art. Growth temperatures near 800° C. (e.g., about 785°–825° C.) were found to give good results.

An important aspect of LPE growth frequently is the rate and manner at which the substrate is rotated in the melt. It has been found that up to about 60 rpm the growth rate and hence the kinetic incorporation of Bi increases significantly. Rotation rates of about 60 rpm, with rotation reversal every cycle, have been found advantageous for growth of first stratum material.

Since Bi incorporation depends on the rotation rate, second stratum material is advantageously grown, in the same melt, by reducing the rotation rate, e.g., to about 8 rpm. However, inventive multi-stratum garnet layers can be grown by other techniques, and all such techniques are contemplated.

Exemplarily, inventive garnet films were grown at rates of about 0.7 $\mu$m/min per side, with Bi concentrations of about 1–1.3 atoms/formula unit, yielding specific rotations of 130°/mm and more. Thus, two-sided growth of garnet layers that yield a 45° rotation can take several hours. Such extended growth can deplete the solute in the melt, especially the rare earths. To maintain the growth rate and desired lattice parameter it has frequently been found desirable to slowly ramp down the melt temperature during film growth. The optimal rate of decrease depends, inter alia, on the melt size. Exemplarily, for a 7 kg melt a decrease rate of about 0.7° C./hr was used during growth on a 2 inch diameter wafer. Periodic melt replenishment typically is necessary, as will be appreciated by those skilled in the art. After completion of film growth it is frequently desirable to polish the film either chemically or mechanically, to remove flux residue and/or to fine-tune the layer thickness to yield the desired Faraday rotation. Exemplarily, the polished wafer is then diced into chips of the required size, the chips are cleaned, antireflection coated, inspected, provided with polarizers, and incorporated into apparatus according to the invention.

A garnet film according to the invention may also comprise temperature compensation means as disclosed in a concurrently filed, co-assigned U.S. patent application entitled "Apparatus Comprising a Magneto-Optic Isolator Utilizing a Garnet Layer", designated Brandle 17-7-8, incorporated herein by reference.

EXAMPLE

In a Pt crucible $Bi_2O_3$, $Tb_2O_3$, $Ga_2O_3$, $Fe_2O_3$, $B_2O_3$ and PbO were melted, with the amounts of the various oxides chosen such that, under the first stratum growth conditions recited below, material of nominal composition $(Bi_{1.2}Tb_{1.8})(Fe_{4.6}Ga_{0.4})O_{12}$ is grown. The melt was heated to 799° C., a 2 inch diameter (111) oriented MCZ:GGG substrate, prepared substantially as described above, was immersed into the melt. The wafer was initially rotated at 60 rpm for about 2.5 hours, resulting in growth of approximately 80 $\mu$m of material of the above cited composition. Thereafter the rotation rate was decreased for about 10 minutes to 8 rpm, resulting in growth of about 2.5 $\mu$m of material of lower Bi-concentration (the "second" stratum). This was followed by further growth at 60 rpm as described above, such that the total thickness of each resulting garnet layer was about 162 $\mu$m. During growth the melt temperature was ramped down at the rate of about 0.6° C./hour. The wafer did not fracture upon cooling to room temperature. The LPE apparatus and the conditions and procedures used, other than those discussed above, were conventional.

The thus produced first stratum material is substantially lattice matched to the substrate at room temperature, and at 800° C. has a lattice constant that exceeds that of the substrate by about 0.025 Å. The second stratum had nominal composition $Bi_{1.1}Tb_{1.9}Ga_{0.4}Fe_{4.6}O_{12}$. The lattice constant of such material at room temperature is substantially less than that of the substrate, and is less than that of the first stratum material at 800° C. Chips diced from the thus produced wafer were incorporated into a magneto-optic isolator and performed as intended.

I claim:

1. Apparatus comprising a source of electromagnetic radiation, radiation utilization means, and magneto-optic isolator means between the source and the utilization means, the isolator means comprising polarizing means, magnet means and a magneto-optic member that comprises a single crystal magneto-optic garnet layer on a single crystal substrate;

CHARACTERIZED IN THAT the garnet layer comprises at least a first and a second stratum of garnet material; the first stratum having a first composition selected such that the lattice constant of the first stratum is, at a first temperature, substantially equal to the lattice constant of the substrate, and such that the lattice constant of the first stratum is, at a second temperature that is higher than the first temperature, larger than the lattice constant of the substrate; the second stratum having a second composition selected such that the lattice constant of the second stratum is, at the first temperature, less than the lattice constant of the substrate, and such that the lattice constant of the second stratum is, at the second temperature, less than the lattice constant of the first stratum, wherein the first composition is $(Bi_xB_{3-x})(Fe_{5-z}C_z)O_{12}$ and the second composition is $(Bi_{x'}B_{3-x'})(Fe_{5-z}C_z)O_{12}$, B being one or more rare earth elements (atomic number 57-71), optional C is chosen from the group consisting of Ga, Al, and combinations thereof, $1 \leq x \leq 2.5$, $0 \leq z \leq 1$, and $0 < x' < x$.

2. Apparatus of claim 1, wherein the first temperature is approximately room temperature, the second temperature is approximately a garnet layer growth temperature, and the substrate has a first and a second major surface, with a garnet layer on both the first and the second major surfaces.

3. Apparatus of claim 1, wherein the first composition is $(Bi_xTb_yRE_{3-x-y})(Fe_{5-z}Ga_z)O_{12}$, where $0 \leq y \leq 2.0, x+y \leq 3$, and optional RE is one or more rare earths other than Tb; and wherein the second composition is $(Bi_{x'}Tb_{y'}RE_{3-x'-y'})(Fe_{5-z})O_{12}$, with $x'+y' \leq 3$, and $0 \leq y' \leq 2$.

4. Apparatus of claim 1, wherein the substrate is a gadolinium gallium garnet containing at least one of Mg, Ca, and Zr.

5. Apparatus of claim 1, comprising at least two first strata, with a second stratum between the two first strata.

6. Apparatus of claim 1, wherein the source is a semiconductor radiation source, wherein the utilization means comprise an optical fiber, wherein associated with the garnet layer is a saturation magnetization and the magnet means comprise a permanent magnet of strength sufficient to cause the garnet layer to exhibit saturation magnetization, wherein the isolator means further comprise polarizer means, wherein the first composition is $(Bi_xTb_{3-x})Fe_{5-z}Ga_zO_{12}$ and the second composition is $(Bi_{x'}Tb_{3-x'})Fe_{5-z}Ga_zO_{12}$, $1 \leq x \leq 2$, $0 \leq z \leq 1$, $0 < x' < x$.

7. Apparatus of claim 6, wherein the semiconductor radiation source is a laser or a light emitting diode (LED), and the radiation emitted by the source is in the approximate range 0.8 μm-1.6 μm.

8. Apparatus of claim 7, wherein the substrate has a first and a second side, with a garnet layer on each of the first and second sides of the substrate, each garnet layer comprising at least two first strata, with a second stratum there between, and the total thickness of each garnet film is greater than about 100 μm, x is about 1.2, and z is about 0.4.

* * * * *

UNITED STATES PATENT AND TRADEMARK OFFICE
CERTIFICATE OF CORRECTION

PATENT NO. : 5,146,361
DATED : September 8, 1992
INVENTOR(S) : Steven J. Licht

It is certified that error appears in the above-identified patent and that said Letters Patent is hereby corrected as shown below:

Column 7, line 28, "$(Fe_{5-z})O_{12}$" should read --$(Fe_{5-z}Ga_z)O_{12}$--.

Signed and Sealed this

Seventh Day of September, 1993

*Attest:*

BRUCE LEHMAN

*Attesting Officer*     *Commissioner of Patents and Trademarks*